United States Patent [19]

Schmalzriedt et al.

[11] Patent Number: 5,321,231
[45] Date of Patent: Jun. 14, 1994

[54] SYSTEM FOR SUPPLYING POWER TO AN ELECTRICALLY HEATED CATALYST

[75] Inventors: Truman T. Schmalzriedt, Farmington Hills; Paul A. Battiston, St. Clair Shores; David R. Lancaster, Troy, all of Mich.

[73] Assignee: General Motors Corporation, Detroit, Mich.

[21] Appl. No.: 825,221

[22] Filed: Jan. 24, 1992

[51] Int. Cl.$^5$ .............................. H05B 1/02; B60L 1/02
[52] U.S. Cl. ..................................... 219/497; 219/486; 219/485; 219/202; 219/206; 219/509; 307/16; 322/90
[58] Field of Search ............... 219/202, 203, 205, 506, 219/508, 509, 497, 501, 494, 482, 483–486; 307/16; 322/7, 8, 90; 323/142.5 R

[56] References Cited

U.S. PATENT DOCUMENTS

| | | | |
|---|---|---|---|
| 4,692,684 | 9/1987 | Schaeffer | 219/202 |
| 4,780,619 | 10/1988 | Campbell et al. | 219/203 |
| 4,884,018 | 11/1989 | Meuret et al. | 219/203 |
| 4,950,972 | 8/1990 | Berg | 219/202 |
| 4,967,137 | 10/1990 | Cantrot et al. | 322/7 |
| 4,976,929 | 12/1990 | Correlison et al. | 422/174 |
| 5,068,589 | 11/1991 | Offiler et al. | 219/203 |

*Primary Examiner*—Mark H. Paschall
*Attorney, Agent, or Firm*—Creighton R. Meland

[57] ABSTRACT

An electrical system for supplying power to an electrical resistive heater that heats the catalyst of a catalytic converter. The electrical system includes an alternating current generator that has an output winding and a field winding that is carried by the rotor of the generator. The rotor is driven by an engine on a motor vehicle. The motor vehicle loads, including a storage battery are supplied with current by a first bridge rectifier that is connected to the output winding of the generator. The resistive catalyst heater is supplied with current by a circuit that includes a step-up transformer connected between the output winding of the generator and a second bridge rectifier that feeds the heater. The system can be operated in a high power mode for supplying a higher level of power to the heater. In the high power mode, the motor vehicle loads and battery are disconnected from the first bridge rectifier while still allowing the battery to supply current to the electrical loads, a voltage regulating means for controlling field current is disabled and the field winding is supplied with a predetermined current and the engine idle speed is increased. The output voltage of the second bridge rectifier is controlled as a function of the temperature of the catalyst and the output voltage of the second bridge rectifier can be pulse-width modulated.

26 Claims, 3 Drawing Sheets

SYSTEM FOR SUPPLYING POWER TO AN ELECTRICALLY HEATED CATALYST

This invention relates to an electrical system for supplying power to a heating element of an electrically heated catalyst of an engine exhaust gas catalytic converter.

Electrically heated catalytic converters, that is, where a resistive heater or element heats the catalyst of the converter, are known to those skilled in the art. In motor vehicle use, the catalyst heater can be energized from the conventional twelve-volt electrical system on a motor vehicle where that electrical system includes an alternating current generator that is connected to a bridge rectifier and where that bridge rectifier supplies the battery and electrical loads on the motor vehicle as well as the catalyst heater. In order to raise the catalyst to its operating temperature in a short enough time so that compliance with emissions standards is achieved, high power levels must be supplied to the converter. If the heater is energized from the conventional vehicle twelve-volt system, the current levels required to generate that power are on the order of hundreds of amperes, and accordingly require large conductors. In addition, heating the converter at twelve-volts with large currents and a low heater resistance is inherently inefficient because of the high ratio of lead resistance to total circuit resistance. Finally, large power requirements at low voltage levels can only be obtained through sufficient draw on the battery which results in a severe reduction of its expected life.

In contrast to a conventional twelve-volt motor vehicle electrical system for energizing a resistive catalyst heater, and in accordance with one aspect of this invention, the output winding of an alternating current generator that supplies electrical power to the motor vehicle loads through a first bridge rectifier is connected to the input terminals of a step-up transformer. The output terminals of the step-up transformer are connected to a second bridge rectifier which, in turn, is connected to supply direct voltage power to the catalyst heater. The transformer steps-up the voltage applied to its input terminals and, accordingly, the input voltage to the second bridge rectifier is increased.

In accordance with another aspect of this invention, a system of the type described, that utilizes a transformer and first and second bridge rectifier is provided which can be operated in two modes of operation, namely, a lower power mode and a higher power mode. In the higher power mode, more power is delivered to the catalyst heater than when the system is operating in the lower power mode. The lower power mode is used to maintain the temperature of the catalyst at a predetermined value once it has been brought to this temperature by operation in the high power mode. In the lower power mode the first bridge rectifier that is part of a conventional motor vehicle electrical system is connected to the battery and other motor vehicle loads. The output voltage of the alternating current generator is applied to the first bridge rectifier and a conventional generator voltage regulator is provided that controls field current for the field winding of the generator such that the output voltage of the first bridge rectifier is maintained substantially constant.

In the higher power mode of operation, the battery and other motor vehicle loads are disconnected from the first bridge rectifier, the voltage regulator is disabled and a higher current is applied to the field winding of the generator to increase its output voltage and the rotor speed of the generator is increased to further increase the output voltage of the generator. In the higher power mode, the battery is not disconnected from the motor vehicle electrical loads so that the battery can still supply the electrical loads even though the battery is disconnected from the first bridge rectifier.

Another object of this invention is to provide an electrical system of the type described where the output voltage of the second bridge rectifier that feeds the catalyst heater is pulse-width modulated such that the duty cycle of the pulse-width modulated voltage progressively increases with elapsed time.

Figure 1:
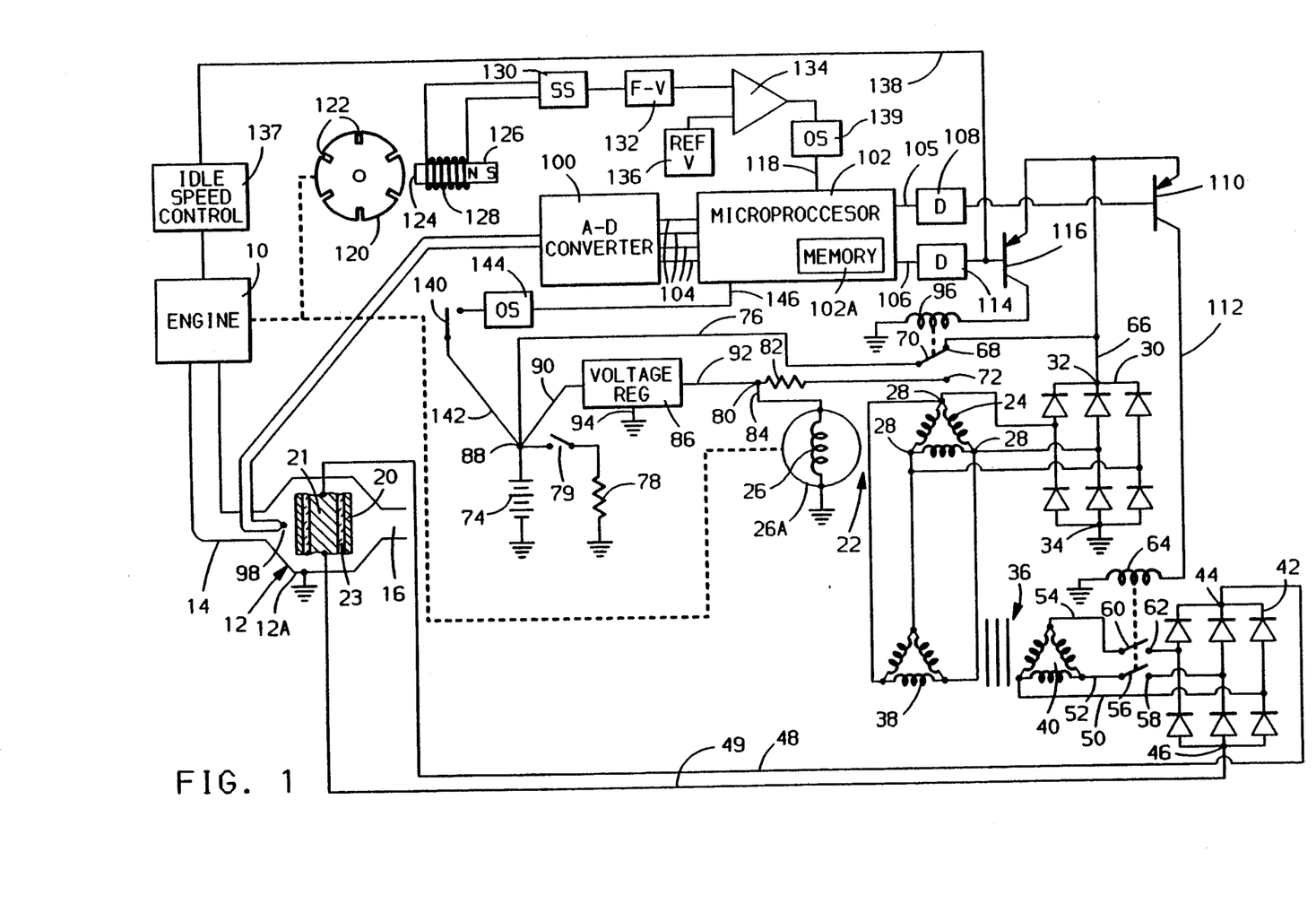
FIG. 1 is a schematic circuit diagram of a power supply system made in accordance with this invention.

Referring to the drawings and more particularly to FIG. 1, the reference numeral 10 designates an internal combustion engine on a motor vehicle. The exhaust manifold of the engine is connected to the inlet side of an electrically heated catalytic converter 12 by pipe 14. The outlet side of converter 12 is connected to an exhaust pipe 16. The converter 12 comprises a catalyst 20 and an electric resistive heater 21 which, when energized, heats the catalyst 20. The catalyst 20 is carried by heater 21 and electrically insulated therefrom by an insulating material 23. The electrical resistance of heater 21 may be about 2.5 ohms. The converter 12 has a metallic housing 12A which is shown electrically connected to ground. The resistive heater 21 is electrically insulated from converter housing 12A.

The electrically heated catalyst can take various forms and may be of a type disclosed in the U.S. patent application Ser. No. 576,556, filed on Aug. 31, 1990 and assigned to the assignee of this invention. That patent application discloses a metal foil catalyst substrate constructed of a corrugated Fe-Cr-Al alloy foil strip which corresponds to heater 21 shown in FIG. 1. The strip is coated with a layer of electrical insulating material that corresponds to insulating material 23. The layer of insulating material comprises a coating of aluminum oxide, a second layer which is an alumina gel coat and a third layer which is an alumina washcoat. The alumina washcoat carries a catalyst material which may be, for example, platinum which is identified as 20 in FIG. 1. The metal foil catalyst substrate forms an electrical heater 21 for the catalyst which, as described above, may have a resistance of about 2.5 ohms. The electrically heated catalyst that has been described is a one-piece device, that is, the foil strip forms a resistive heater which carries the catalyst.

The system of this invention can be used with electrically heated catalysts other than the one-piece type that has just been described. Thus, the system of this invention could be used in a catalytic converter where the heating element and catalyst are separate units, for example, of the type disclosed in the Kitzner et al., U.S. Pat. No. 3,768,982.

The system for supplying current to the heater 21 comprises an alternating current generator 22 that has a three phase Delta-connected output or stator winding 24 and a field winding 26. The field winding 26 is carried by the rotor 26A of the generator and the rotor is driven by engine 10 in a manner well known to those skilled in the art and as illustrated by the dotted line in FIG. 1.

The AC output terminals 28 of output winding 24 are connected to the AC input terminals of a three phase full wave bridge rectifier 30 that is comprised of six diodes as shown. The bridge rectifier 30 has a positive direct voltage output terminal 32 and a negative direct voltage output terminal 34 that is connected to ground.

The system of this invention has a three phase transformer 36 comprised of a Delta-connected primary winding 38 and a Delta-connected secondary winding 40. Transformer 36 is a step-up transformer, that is, the secondary winding 40 has a larger number of turns than the primary winding 38. The turns ratio between primary winding 38 and secondary winding 40 may be about 1 to 4 so that the voltage at the AC output terminals of secondary winding 40 is about four times the voltage applied to primary winding 38.

The AC output terminals of secondary winding 40 can feed the AC input terminals of another three phase full wave bridge rectifier 42 that is comprised of six diodes as shown. Bridge rectifier 42 has a positive direct voltage output terminal 44 and a negative direct voltage output terminal 46.

The direct voltage output terminal 44 of bridge rectifier 42 is connected to one side of resistive catalyst heater 21 by a conductor 48. The direct voltage output terminal 46 is connected to the opposite side of heater 21 by a conductor 49. Accordingly, when bridge rectifier 42 is energized, the direct voltage output of bridge rectifier 42 is applied to heater 21.

One of the output terminals of secondary winding 40 is directly connected to one of the AC input terminals of bridge rectifier 42 by conductor 50. The other two AC output terminals of secondary winding 40 are connected respectfully to conductors 52 and 54. Conductor 52 is connected to a movable relay contact 56 that cooperates with a fixed relay contact 58 that is connected to an AC input terminal of bridge rectifier 42. Conductor 54 is connected to a movable relay contact 60 which cooperates with fixed relay contact 62. Contact 62 is connected to an AC input terminal of bridge rectifier 42.

With contact 56 engaging contact 58 and contact 60 engaging contact 62, the AC output terminals of secondary winding 40 are connected to the AC input terminals of bridge rectifier 42 and accordingly a direct voltage is developed at the output terminals of bridge rectifier 42. When contact 56 is not engaging contact 58 and contact 60 is not engaging contact 62, the secondary winding 40 is disconnected from the AC input terminals of bridge rectifier 42 and there is no voltage developed at the direct voltage output terminals of bridge rectifier 42.

Movable relay contacts 58 and 60 may be normally spring-biased to an open position and moved to a closed position by the energization of a relay coil 64. As will be described in more detail hereinafter, the relay coil 64 is energized and deenergized during the operation of the system.

The positive direct voltage output terminal 32 of bridge rectifier 30 is connected to a conductor 66. Conductor 66 is connected to a fixed relay contact 68 that can engage a movable relay contact 70. The movable relay contact can also engage a fixed relay contact 72.

When movable relay contact 70 is engaging fixed contact 68, the positive direct voltage output terminal 32 of bridge rectifier 32 is connected to the positive side of a battery 74 by a conductor 76. The negative side of battery 74 is connected to ground. The battery 74 may be a twelve-volt storage battery for a motor vehicle electrical system. A twelve-volt motor vehicle electrical load 78 is connected across battery 74 when switch 79 is closed. There are, of course, a number of switches and a number of electrical loads on a motor vehicle and only one switch and one load has been illustrated.

The fixed contact 72 is connected to a junction 80 through a resistor 82. The field winding 26 of generator 22 is connected between junction 80 and ground through a conductor 84.

A generator field controlling voltage regulator 86 is connected between junctions 80 and 88 by conductors 90 and 92. Junction 88 is connected to the positive side of battery 74. The voltage regulator 86 has a voltage sensing circuit (not illustrated) connected between conductor 90 and grounded conductor 94 which senses the voltage across battery 74 and electrical load 78. The voltage regulator 86 further has a semiconductor switching device (not illustrated), which may be a transistor, connected between conductors 90 and 92. When this switching device is biased conductive, current is supplied to field winding 26 through conductors 90, 92 and 84. When the switching device is biased nonconductive, no current flows through field winding 26 through the current path that has just been described. The ON-OFF switching of the switching device is controlled as a function of the sensed voltage across battery 74 and load 78. When the sensed voltage is below a predetermined value, for example fourteen volts, the switching device is turned ON to cause the generator voltage to increase. When the sensed voltage exceeds fourteen volts, the switching device is turned OFF thereby causing field current to be cut-off and generator voltage accordingly decreases. The ON-OFF switching of the switching device operates to maintain the voltage below junction 88 and ground at a substantially constant value of about fourteen volts. The voltage regulator that has been described can be of the type disclosed in the Bowman et al., U.S. Pat. No. 4,636,706, the disclosure of which is incorporated herein by reference.

When the movable contact 70 is engaging fixed contact 68, the system operates in a so-called lower power mode. If the movable contact 70 is moved out of engagement with fixed contact 68 and into engagement with fixed contact 72, the electrical system operates in a different so-called higher power mode. Thus, when movable contact 70 becomes disengaged from fixed contact 68 the battery 74 and the electrical loads 78 of the motor vehicle are disconnected from bridge rectifier 30. The only load that is now supplied by generator 22 is the electrical catalyst heater 21. During this condition of operation, the battery 74 can still supply the motor vehicle loads 78.

When movable contact 70 engages fixed contact 72, the voltage regulator 86 is short-circuited so that it no longer controls field current. The field current for field winding 26 is now supplied by battery 74 through a circuit that is from junction 88, through conductor 76, through closed contacts 70 and 72, through resistor 82 and then through conductor 84 to field winding 26. In the mode of operation that has just been described, the field current supplied to field winding 26 has a substantially constant value which is a function of the resistance of resistor 82. The resistance of resistor 82 is selected to cause the voltage generated in output winding 24 to increase above a value that it has when voltage regulator 86 is controlling. By way of example, if voltage generated in output winding 24 is about fourteen volts when voltage regulator 86 is controlling, the output voltage generated in output winding 24 can be increased to about twenty volts when field current is being supplied to field winding 26 through resistor 82.

The position of movable contact 70 is controlled by a relay coil 96. Movable contact 70 can be spring-biased into engagement with fixed contact 68 and moved into engagement with fixed contact 72 when relay coil 96 is energized.

As will be described in more detail hereinafter, the electrical catalyst heater 21 is energized from bridge rectifier 42 in the high power mode when the movable contact 70 engages fixed contact 72. This causes the normal motor vehicle electrical loads (battery 74 and load 78) to be disconnected from bridge rectifier 30 and hence disconnected from generator 22. Further, the output voltage of generator 22 is increased.

The temperature of catalyst 20 is sensed by a thermocouple 98 or other type of temperature sensor which engages the catalyst and which develops a voltage the magnitude of which is a function of the temperature of catalyst 20. The voltage developed by thermocouple 98 is applied to the input of an analog to digital converter 100. The output of A to D converter 100 is applied to inputs of a microprocessor or microcomputer 102 by lines 104. A binary digital signal is applied to lines 104 which represents the temperature of catalyst 20. The microprocessor 102 is programmed to perform certain control functions in a manner to be described.

Two output lines 105 and 106 are connected to microprocessor 102. Line 105 is connected to a driver and transistor biasing circuit 108. Circuit 108 is connected to the base of a PNP transistor 110. The emitter of transistor 110 is connected to conductor 66 and its collector is connected to one side of relay coil 64 by conductor 112. The opposite side of relay coil 64 is grounded. When transistor 110 is biased conductive, relay coil 64 is energized causing contacts 56 and 60 to close and thereby energizing bridge rectifier 42 from secondary winding 40. When transistor 110 is biased nonconductive, contacts 56 and 60 move to an open position and accordingly secondary winding 40 is disconnected from bridge rectifier 42 and there is no output voltage developed by bridge rectifier 42.

Output line 106 is connected to a driver and transistor biasing circuit 114. This circuit is connected to the base of another PNP transistor 116. The emitter of transistor 116 is connected to conductor 66 and its collector is connected to one side of relay coil 96. The opposite side of relay coil 96 is grounded. When transistor 116 is biased conductive, relay coil 96 is energized causing movable contact 70 to engage fixed contact 72. When transistor 116 is biased nonconductive, relay coil 96 is not energized and movable contact 70 engages fixed contact 68.

The microprocessor 102 has an input connected to a conductor 118. The system develops a signal on conductor 118 which indicates whether or not the engine 10 is running. To this end, the engine 10 drives a wheel 120 that has a plurality of circumferentially spaced slots 122. The wheel is associated with a variable reluctance pick-up comprised of magnetic core 124, permanent magnet 126 and pick-up coil 128 wound on core 124. As the slots on the wheel rotate past the pick-up, voltages are induced in coil 128. The induced voltage is applied to a signal shaping circuit 130. The output of circuit 130 is a series of square wave pulses the frequency of which are a function of engine speed. The output of circuit 130 is connected to the input of a frequency to voltage converter 132. The output of the frequency to voltage converter is applied to one input of a voltage comparator 134. The other input of comparator 134 is connected to a source of constant reference voltage 136. The output of comparator 134 is connected to conductor 118 through a one-shot multivibrator 139. When the engine is running, the frequency of the square wave pulses developed at the output of circuit 130 will be such as to cause the signal on line 118 to assume a state that is indicative of the fact that engine 10 is running. The microprocessor 102 therefore receives a signal indicative of an engine running condition. The signal developed on line 118 can be developed by means other than the system that has been described. Thus, in known digital electronic engine controls, a signal is developed which depends upon whether or not the engine is running.

The system of this invention has an engine idle speed control 137 which may be of the type disclosed in the Butts et al., U.S. Pat. No. 4,629,968. The idle speed control 137 is connected to a conductor 138 which is connected to the output of driver circuit 114. When the output of circuit 114 is at such a level as to bias transistor 116 conductive, the signal on line 138 is at such a level as to cause the idle speed control 137 to increase the idle speed of engine 10. Thus, if the normal engine idle speed of the engine is about 700 RPM the speed is increased to about 1500 RPM when the signal at the base of transistor 116 biases transistor 116 conductive. The output of driver 114 and hence the signal on line 116, which biases transistor 116 conductive, occurs when the system is operating in the higher power mode. Accordingly, when the catalyst heater 21 is energized in the higher power mode, the engine idle speed is increased to increase the magnitude of the voltage generated by generator 22.

The switch 140 shown in FIG. 1 is an ignition switch and it controls the energization of an ignition system (not shown) for engine 10. Switch 140 is connected to battery 74 by conductor 142 and to a one-shot multivibrator 144. The one-shot 144 is connected to conductor 146 which is connected to an input of microprocessor 102. The signal developed on line 146 resets microprocessor 102 to an initialized state.

Before proceeding to a description of the programmed steps executed by microprocessor 102, a general description of the operation of the system of this invention will now be described.

Assume that the engine 10 has not been running for a long period of time so that catalyst 20 has not been heated up. When the engine starts, an engine-run signal is developed on line 118 indicating to microprocessor 102 that the electrical heating cycle for catalyst 20 should start. Thermocouple 98 now develops a signal indicating that the temperature of catalyst 20 is below a predetermined temperature of, for example, 400° C. Under this condition of operation, the system will operate in the higher power mode and both transistors 110 and 116 are biased conductive. With transistor 116 conducting three events take place; namely, battery 74 and load 78 are disconnected from bridge rectifier 30, voltage regulator 86 is disabled and field current is increased via resistor 82 and the engine idle speed is increased to about 1500 RPM. All three events tend to increase the amount of power that can be delivered to electrical catalyst heater 21 by generator 22.

During the energization of heater 21 in the higher power mode, transistor 110 is repeatedly switched ON and OFF by the microprocessor output signal on line 104. This pulse-width modulates the direct voltage output of bridge rectifier 42. The pulse-width modulation of the output voltage of bridge rectifier 42 is shown in FIG. 2.

Figure 2:
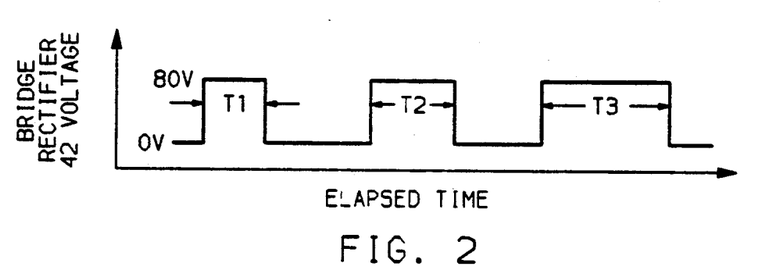
FIG. 2 illustrates a pulse-width modulated output voltage of the bridge rectifier shown in FIG. 1 that is connected to an electrical heater that heats the catalyst.

In FIG. 2, the direct voltage output of bridge rectifier 42 is plotted against elapsed time. This voltage is zero when bridge rectifier 42 is not energized (contacts 58 and 60 open) and may be about eighty volts when bridge rectifier 42 is energized (contacts 58 and 60 closed). The waveform shown in FIG. 2 is a pulse-width modulated waveform having a constant frequency and variable duty cycle. Further, the duty cycle or the time period that the output voltage of bridge rectifier 42 is at eighty volts progressively increases as time elapses. This is depicted in FIG. 2 where three consecutively occurring duty cycles T1, T2 and T3 that correspond to time periods where the output voltage of bridge rectifier 42 is eighty volts is shown. Time period or duty cycle T1 starts when electrical heater 21 is to be initially energized in the higher power mode. The next occurring duty cycle or time period T2 is longer than T1 and the duty cycle or time period T3 is longer than T2. Thus, the duty cycle of the output voltage of bridge rectifier 42 is progressively increased as time elapses. The waveform shown in FIG. 2 is not to be taken as showing actual duty cycles of the output voltage of bridge rectifier 42 but rather it generally depicts a pulse-width modulated mode of operation in which the duty cycle progressively increases with elapsed time. The purpose for using pulse-width modulation is to not heat the catalyst too rapidly thereby preventing a failure of the catalyst by rapid heating.

The pulse-width modulation mode that has been described is utilized when the system is operating in the higher power mode and begins from the first time that the engine starts until a time period of about four minutes elapses or when the temperature of catalyst 20 attains the predetermined temperature of about 400° C., whichever occurs first. When either of these events occurs, the system is shifted into the lower power mode of operation. In the lower power mode, pulse-width modulation is terminated, battery 74 and loads 78 are reconnected to bridge rectifier 30, the voltage regulator 86 is connected to the system to control field current and engine idle speed reduced from 1500 RPM to 700 RPM. Thus, whenever either of the two above-mentioned events first occur, transistor 116 is biased nonconductive thereby deenergizing relay coil 96 which causes movable contact 70 to engage fixed contact 68. Bridge rectifier 30 is now connected to battery 74 and electrical loads 78. Further, voltage regulator 86 now operates to maintain the voltage between junction 88 and ground at a substantially constant voltage of about fourteen volts. With voltage regulator 86 controlling field current as described, the voltage applied to primary winding 38 will be regulated by voltage regulator 86. This voltage is boosted by transformer 36 so that the output voltage of bridge rectifier 44 will be about 62 volts. This voltage is lower than the voltage (eighty volts) that is produced when the system was operating in the higher power mode. There are two reasons for this. First of all, the voltage regulator 86 is now controlling field current instead of purposely increasing the output voltage of the generator by supplying higher field current through resistor 82. Secondly, when transistor 116 is biased nonconductive, the signal on line 138 causes the idle speed of the engine to be reduced from about 1500 RPM to a normal idle speed of about 700 RPM.

In the lower power mode of operation, contacts 56 and 60 are opened and closed in response to the temperature of catalyst 20. When the temperature of catalyst 20 is below 400° C., the contacts 56 and 60 are closed thereby energizing bridge rectifier 42. When the temperature of catalyst 20 exceeds 400° C., contacts 58 and 60 open thereby disconnecting secondary winding 40 from bridge rectifier 42. Thus, after the elapse of the four minute time period or after the temperature of the catalyst first reaches 400° C. after an engine start, whichever occurs first, the temperature of the catalyst 20 is maintained at about 400° C. by operating the system in the lower power mode.

The system operates such that once the engine starts as indicated by the signal on line 118, the system goes into the higher power mode, including pulse-width modulation, until the temperature of the catalyst 20 reaches about 400° C. or the four minute time period has expired. Thereafter, the system switches to the lower power mode and remains in the mode as long as the engine is continuously running.

When the engine is started by closing ignition switch 142, the one-shot multivibrator 144 applies a signal to microprocessor 102 via line 146 which resets the microprocessor to a condition where a subsequent start of the engine will cause the system to operate in the higher power mode. Thus, each time the engine is started, the system starts operation in the higher power mode.

It will, of course, be appreciated that as long as the temperature of the catalyst is above 400° C. bridge rectifier 42 is never energized regardless of the mode of operation that is then controlling.

Figure 3:
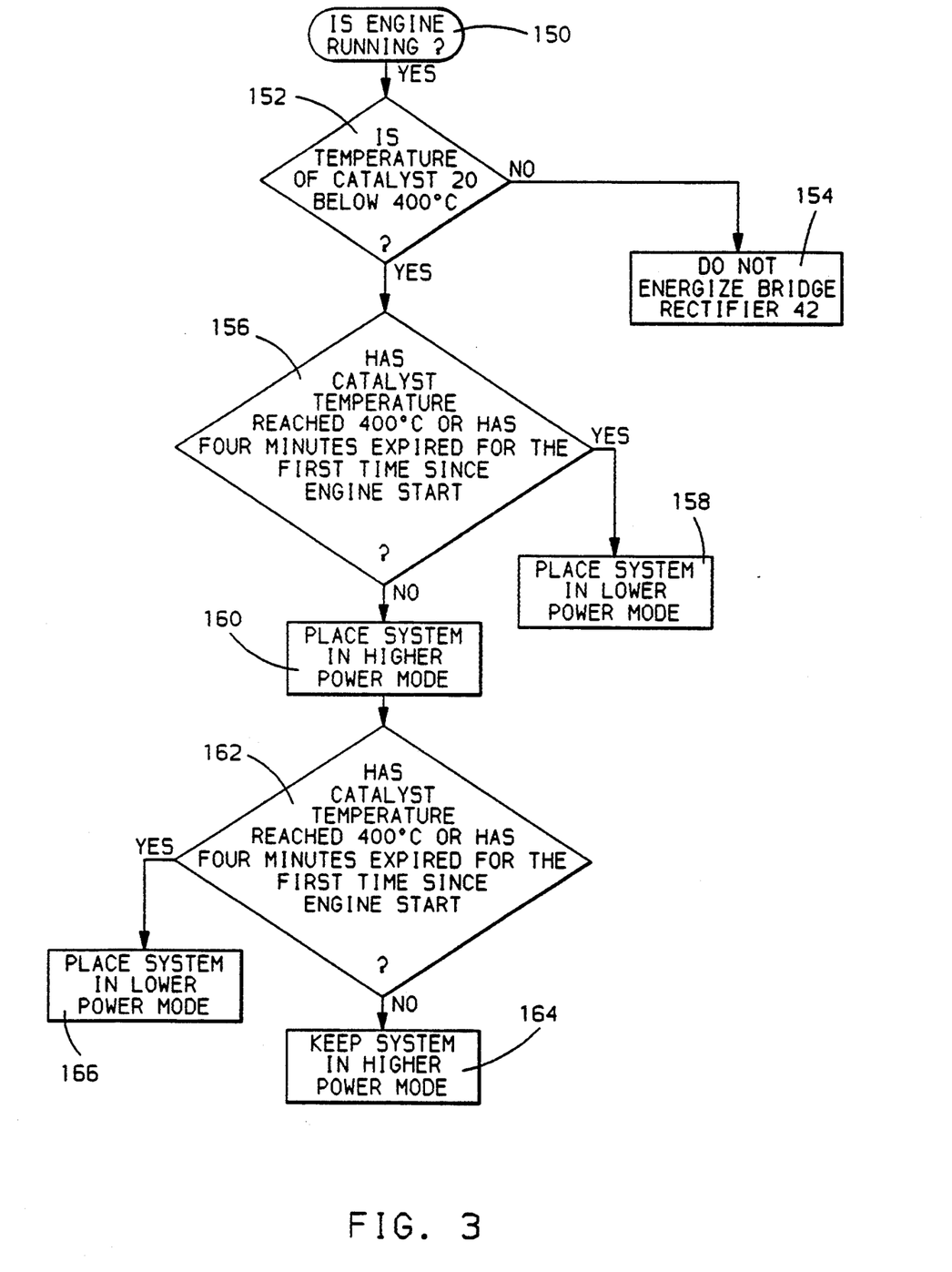
FIG. 3 is a flow diagram of steps that are executed by the microprocessor of the system shown in FIG. 1.

FIG. 3 illustrates the programmed steps that are executed by microprocessor 102 to control the system of this invention. The microprocessor 102 has a memory 102A which contains the instructions for the programmed steps to be executed. Memory 102A also contains data related to the temperature of catalyst 20 and to data that is used in the computation of the duty cycle of the output voltage of bridge rectifier 42 shown in FIG. 2.

Referring to FIG. 3, in programmed step 150 it is determined whether or not engine 10 is running. If the answer is YES the program moves to step 152 where it is determined whether or not the temperature of catalyst 20 is below 400° C. If the answer is NO, step 154 is executed to prevent the energization of bridge rectifier 42 (contacts 56 and 58 held open). If the answer to step 152 is YES, the program proceeds to step 156.

In step 156, it is determined whether or not catalyst temperature has reached 400° C. or whether four minutes has expired for the first time since an engine start. If the answer is YES, the system is placed in the so-called lower power mode, that is, as previously explained, in a mode where contact 70 engages contact 68 and where engine idle speed is set to normal idle speed.

The placing of the System in the lower power mode is indicated by step 158.

If the answer to step 156 is NO, the system is placed in the so-called higher power mode as indicated by step 160. As previously explained, when the system is in the so-called higher power mode, contact 70 engages contact 72, the output voltage of bridge rectifier 42 is pulse-width modulated and engine idle speed is increased from normal engine idle speed to a speed of about 1500 RPM.

The program now proceeds to step 162 in which it is determined whether or not the temperature of the catalyst has reached 400° or four minutes has expired since engine start. As long as the answer is NO, the system is kept in the higher power mode as indicated by step 164. If the answer is YES, the system is placed in the lower power mode as indicated by step 166.

In the higher power mode, the amount of power delivered to catalyst heater 21 may be about 2400 watts. In the lower power mode, the power delivered to catalyst heater 21 may be about 1500 watts.

If there is no concern regarding the durability of catalyst 21, the output voltage of bridge rectifier 42 need not be pulse-width modulated when the system is operating in the higher power mode. Thus, the system can be arranged, when operating in the higher power mode, to energize bridge rectifier 42 when the temperature of the catalyst 20 is below 400° C. and deenergize bridge rectifier 42 when the temperature of catalyst 20 is above 400° C.

Figure 4:
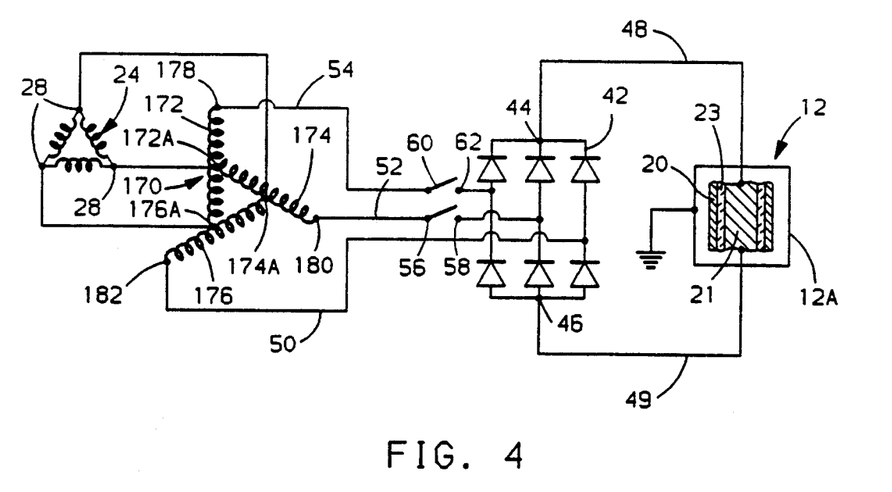
FIG. 4 illustrates a modification of the system shown in FIG. 1 that utilizes an autotransformer.

FIG. 4 illustrates a modification of a portion of the system shown in FIG. 1. In FIG. 4, the same reference numerals have been used as were used in FIG. 1 to identify the same components in each figure. In FIG. 4, an autotransformer generally designated as 170 has been substituted for the transformer 36. This autotransformer has windings 172, 174 and 176. The autotransformer has input terminals or taps 172A, 174A and 176A and has output terminals 178, 180 and 182. The input terminals 172A, 174A and 176A are connected respectively to the AC output terminals 28 of the output winding 24 of the alternating current generator 22.

The output terminals 178, 180 and 182 are connected respectfully to lines 54, 52 and 50. Line 50 is connected to one of the AC input terminals of the bridge rectifier 42. Relay contacts 60 and 62 are connected between line 54 and an AC input terminal of bridge rectifier 42. Relay contacts 56 and 58 are connected between line 52 and an AC input terminal of bridge rectifier 42. The direct voltage output terminals 44 and 46 of bridge rectifier 42 are connected to resistive heater 21 by conductors 48 and 49. The outer metallic casing 12A of converter 12 is connected to ground as shown.

The autotransformer 170 performs that same function as the transformer 36 of FIG. 1, that is, it steps-up the voltage applied to its input terminals 172A, 174A and 176A. Thus, the voltage at output terminals 178, 180 and 182 can be about four times the voltage applied to the input terminals 172A, 174A and 176A.

Some of the advantages of using an autotransformer in the system of FIG. 1, as compared to a transformer like transformer 36 that has separate primary and secondary windings, is that there is a lower voltage with respect to ground at resistive heater 21. Further, there is less chance of an insulation break-down to ground. In addition, the manufacturing cost of an autotransformer is less than a transformer that has separate primary and secondary windings. By using an autotransformer, no primary-secondary winding electrical insulation is needed and there are lower losses in the windings.

It has been pointed out that the rotor speed of rotor 26A of generator 22 is increased when heater 21 is energized in the higher power mode and that this was accomplished by increasing engine idle speed. Alternatively, a variable or multiple speed drive could be used to increase the ratio of alternator rotor speed to engine speed at engine idle. Such a variable speed drive would be connected between engine 10 and rotor 26A and would increase generator rotor speed when the system is operating in the higher power mode.

The following describes a modification of the systems shown in FIGS. 1 and 4. In the systems of FIGS. 1 and 4, the resistive heater 21 is energized with direct current from bridge rectifier 42. The resistive heater 21 could be energized with alternating current from the output terminals of secondary winding 40 in FIG. 1 or from terminals 178, 180 and 182 in the case of the system shown in FIG. 4, thus eliminating the bridge rectifier 42. The resistive heater 21 in the described modification would be made up of three segments or portions connected in a delta or Y connection.

The embodiments of the invention in which an exclusive property or privilege is claimed are defined as follows:

1. An electrical system for providing electrical power to an electrically heated catalyst of a catalytic converter, comprising in combination, a catalytic converter having a catalyst that is heated by the supply of current to a resistive heater, an alternating current generator having a polyphase output winding and a field winding, a bridge rectifier having direct voltage output terminals and AC input terminals connected to said output winding, a direct voltage motor vehicle load circuit including a battery, a switching means connected between said first bridge rectifier and said load circuit for connecting and disconnecting said bridge rectifier and said load circuit, a transformer having input terminals connected to said output winding and output terminals, a resistive heater energizing circuit connected between said output terminals of said transformer and said resistive heater for energizing said resistive heater from said output terminals of said transformer, said transformer stepping-up the voltage applied to its input terminals whereby the voltage that is developed at its output terminals is higher than the voltage applied to said input terminals, temperature sensing means sensing the temperature of said catalyst, control means coupled to said temperature sensing means for causing said resistive heater to be energized when the temperature of said catalyst is below a predetermined temperature and for causing no voltage to be applied to said resistive heater when the temperature of said catalyst is above said predetermined temperature, voltage regulating means including voltage sensing means that senses the output voltage of said bridge rectifier, said voltage regulating means connected to said field winding and operative to control field current to maintain the output voltage of said bridge rectifier substantially constant, and means for at times causing said system to increase the amount of power supplied to said resistive heater, said last named means including means for disconnecting said load circuit from said bridge rectifier, means for disabling said voltage regulator from control of field current and means for applying a current to said field winding that is of such a magnitude as to cause the magnitude of the output voltage generated in said output winding to be higher than it is when it is controlled by said voltage regulating means.

2. The electrical system according to claim 1 where said control means comprises a switching means connected between said output terminals of said transformer and said resistive heater, said switching means being closed when the temperature of said catalyst is below said predetermined value and being open when the temperature of said catalyst is above said predetermined value.

3. The electrical system according to claim 1 where said alternating current generator has a rotor that is driven by said engine and where said means for at times causing said system to increase the amount of power supplied to said resistive heater further includes means for increasing the speed of said rotor.

4. The electrical system according to claim 1 where said alternating current generator has a rotor that is driven by an engine and where said means for at times causing said system to increase the amount of power supplied to said resistive heater further includes means for increasing the idle speed of said engine.

5. The electrical system according to claim 1 where said direct voltage motor vehicle load circuit includes an electrical load in addition to said battery and wherein said electrical load can be energized from said battery when said switching means disconnects said load circuit from said first bridge rectifier.

6. The electrical system according to claim 1 where said transformer is an autotransformer.

7. The electrical system according to claim 1 where the resistance of said resistive heater is about 2.5 ohms.

8. An electrical system for providing electrical power to an electrically heated catalyst of a catalytic converter, comprising in combination, a catalytic converter having a catalyst that is heated by the supply of current to a resistive heater, an alternating current generator having a polyphase output winding and a field winding, a first bridge rectifier having direct voltage output terminals and AC input terminals connected to said output winding, a direct voltage motor vehicle load circuit including a battery, a switching means connected between said first bridge rectifier and said load circuit for connecting and disconnecting said first bridge rectifier and said load circuit, a second bridge rectifier having AC input terminals and direct voltage output terminals, means connecting said resistive heater across the direct voltage output terminals of said second bridge rectifier, a transformer having input terminals connected to said output winding and output terminals connected to the AC input terminals of said second bridge rectifier, said transformer stepping-up the voltage applied to its input terminals whereby the voltage that is applied to said second bridge rectifier is higher than the voltage applied to said input terminals of said transformer, temperature sensing means sensing the temperature of said catalyst, control means coupled to said temperature sensing means for causing the direct voltage developed by said second bridge rectifier to be applied to said resistive heater when the temperature of said catalyst is below a predetermined temperature and for causing no voltage to be applied to said resistive heater when the temperature of said catalyst is above said predetermined temperature, voltage regulating means including voltage sensing means that senses the output voltage of said first bridge rectifier, said voltage regulating means connected to said field winding and operative to control field current to maintain the output voltage of said first bridge rectifier substantially constant, and means for at times causing said system to increase the amount of power supplied to said resistive heater, said last named means including means for disconnecting said load circuit from said first bridge rectifier, means for disabling said voltage regulator from control of field current and means for applying a current to said field winding that is of such a magnitude as to cause the magnitude of the output voltage generated in said output winding to be higher than it is when it is controlled by said voltage regulating means.

9. The electrical system according to claim 8 where said control means comprises a switching means connected between said output terminals of said transformer and the AC input terminals of said bridge rectifier, said switching means being closed when the temperature of said catalyst is below said predetermined value and being open when the temperature of said catalyst is above said predetermined value.

10. The electrical system according to claim 8 where said alternating current generator has a rotor that is driven by said engine and where said means for at times causing said system to increase the amount of power supplied to said resistive heater further includes means for increasing the speed of said rotor.

11. The electrical system according to claim 8 where said alternating current generator has a rotor that is driven by an engine and where said means for at times causing said system to increase-the amount of power supplied to said resistive heater further includes means for increasing the idle speed of said engine.

12. The electrical system according to claim 8 where said direct voltage motor vehicle load circuit includes an electrical load in addition to said battery and wherein said electrical load can be energized from said battery when said switching means disconnects said load circuit from said first bridge rectifier.

13. An electrical system according to claim 8 where the system includes means for at times causing the voltage developed at the direct voltage output terminals of said second bridge rectifier to be a pulse-width modulated voltage having a predetermined duty cycle.

14. The electrical system according to claim 8 where the system includes means for at times causing the voltage developed at the direct voltage output terminals of said second bridge rectifier to be a pulse-width modulated voltage and where the duty cycle of the pulse width modulated voltage progressively increases with elapsed time.

15. The electrical system according to claim 8 where said transformer is an autotransformer.

16. The electrical system according to claim 8 where the resistance of said resistive heater is about 2.5 ohms.

17. An electrical system for providing electrical power to an electrically heated catalyst of a catalytic converter, comprising in combination, a catalytic converter having a catalyst that is heated by the supply of current to a resistive heater, an alternating current generator having a polyphase output winding, a full wave bridge rectifier having AC input terminals and first and second direct voltage output terminals, a battery, a junction, a circuit connected between said first direct voltage output terminal of said bridge rectifier and said junction including a switching means, a battery, an electrical load, means connecting said battery between said junction and said second direct voltage output terminal of said bridge rectifier, means connecting said electrical load between said junction and said second direct voltage output terminal of said bridge rectifier, said electrical load being connected across said battery whereby said battery can energize said electrical load, said switching means when open disconnecting said first direct voltage output terminal of said bridge rectifier from said junction to thereby disconnect said battery and electrical load from said first bridge rectifier while permitting said electrical load to be energized from said battery, a resistive heater energizing circuit connected between said generator output winding and said resistive heater for energizing said resistive heater from said output winding, said resistive energizing circuit comprising a transformer, temperature sensing means for sensing the temperature of said catalyst, means responsive to the temperature of said catalyst for controlling the power supplied to said resistive heater by said resistive heater energizing circuit, and means operative at times for causing said switching means to open to thereby disconnect said battery and electrical load from said bridge rectifier when said resistive heater is being energized through said resistive heater energizing circuit.

18. The electrical system according to claim 17 where said transformer has a primary winding connected to said output winding and a secondary winding connected to the AC input terminals of a second bridge rectifier, said resistive heater being connected across the direct voltage output terminals of said second bridge rectifier.

19. The electrical system according to claim 17 where said transformer is an autotransformer.

20. The electrical system according to claim 17 where said transformer has input and output terminals, said input terminals connected to said output winding and said output terminals connected to the AC input terminals of a second bridge rectifier, said resistive heater being connected across the direct voltage output terminals of said second bridge rectifier, and further wherein the means for controlling the power supplied to said resistive heater comprises switching means connected between said output terminals and the AC input terminals of said second bridge rectifier, said switching means being opened and closed in response to the temperature of said catalyst sensed by said temperature sensing means.

21. The electrical system according to claim 17 where said generator has a field winding and a voltage regulating means for controlling field current so as to maintain the output voltage of said generator substantially constant when said voltage regulating means is controlling field current, and means connecting said switching means to said voltage regulating means in such a manner as to cause said voltage regulating means to be disabled from controlling field current and for applying a predetermined current to said field winding when said switching means opens.

22. The electrical system according to claim 17 where said generator has a rotor that is driven by an internal combustion engine and where at times the idle speed of said engine is increased above a normal idle speed value when said generator is supplying power to said resistive heater.

23. The electrical system according to claim 17 where said resistive heater energizing circuit includes means for developing and applying a pulse-width modulated direct voltage to said resistive heater.

24. The electrical system according to claim 17 where said resistive heater energizing circuit includes means for developing and applying a pulse-width modulated direct voltage to said resistive heater where the duty cycle of the said pulse-width modulated voltage progressively increases with elapsed time.

25. The electrical system according to claim 17 where said alternating current generator has a rotor that is driven by said engine and means for at times increasing the speed of said rotor.

26. The electrical system according to claim 17 where the resistance of said resistive heater is about 2.5 ohms.

* * * * *